United States Patent
Gill et al.

(10) Patent No.: US 10,247,032 B2
(45) Date of Patent: Apr. 2, 2019

(54) GAS TURBINE ENGINE AND TEST CELL REAL-TIME DIAGNOSTIC FAULT DETECTION AND CORRECTIVE ACTION SYSTEM AND METHOD

(71) Applicant: HONEYWELL INTERNATIONAL INC., Morris Plains, NJ (US)

(72) Inventors: Christopher Gill, Gilbert, AZ (US); Curtis Vedder, Avondale, AZ (US); Kevin Moeckly, Chandler, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 46 days.

(21) Appl. No.: 15/471,204

(22) Filed: Mar. 28, 2017

(65) Prior Publication Data

US 2018/0283200 A1     Oct. 4, 2018

(51) Int. Cl.
*F01D 21/00*     (2006.01)
*G01M 15/14*     (2006.01)

(52) U.S. Cl.
CPC ........... *F01D 21/003* (2013.01); *G01M 15/14* (2013.01); *F05D 2220/32* (2013.01)

(58) Field of Classification Search
CPC ... F01D 21/003; G01M 15/14; F05D 2220/32
USPC ............ 702/33, 35, 113, 182, 189; 701/100; 348/143
See application file for complete search history.

(56) References Cited

U.S. PATENT DOCUMENTS

| | | |
|---|---|---|
| 4,215,412 A | 7/1980 | Bernier et al. |
| 5,214,577 A | 5/1993 | Sztipanovits et al. |
| 6,138,081 A | 10/2000 | Olejack et al. |
| 6,519,552 B1 | 2/2003 | Sampath et al. |
| 6,643,570 B2 | 11/2003 | Bangert et al. |
| 6,823,675 B2 | 11/2004 | Brunell et al. |
| 6,832,205 B1 | 12/2004 | Aragones et al. |
| 6,871,160 B2 | 3/2005 | Jaw |
| 7,062,370 B2 | 6/2006 | Vhora et al. |

(Continued)

FOREIGN PATENT DOCUMENTS

WO     8103079 A1     10/1981

OTHER PUBLICATIONS

Gregerson, S; Leveraging Predictive Analytics Technology for Reliability Improvements; Power Engineering; Oct. 6, 2014; Copyright © 2007-2016. PennWell Corporation, Tulsa, OK.

*Primary Examiner* — John H Le
(74) *Attorney, Agent, or Firm* — Lorenz & Kopf, LLP

(57) ABSTRACT

A real-time diagnostic and fault detection system and method for a gas turbine engine under test in a test cell is disclosed. Sensor data from instrumentation coupled to the gas turbine engine are processed, using a physics-based component level aero-thermal model, to calculate a plurality of engine parameters at a plurality of non-instrumented locations within the gas turbine engine. The plurality of engine parameters are processed to detect when a fault exists and, when a fault does exist, an image is rendered that indicates at least a mostly likely cause for the fault and one or more corrective actions that can be taken to correct the fault. The model is also used to generate projections of engine performance at one or more selected test conditions, and to prognosticate, based on the projections, as to whether the gas turbine engine will actually pass at the one or more selected test conditions.

20 Claims, 5 Drawing Sheets

(56) References Cited

U.S. PATENT DOCUMENTS

| | | | |
|---|---|---|---|
| 7,103,460 B1 | 9/2006 | Breed | |
| 7,233,884 B2 * | 6/2007 | Volponi | G05B 23/0275 |
| | | | 702/189 |
| 8,417,410 B2 | 4/2013 | Moeckly et al. | |
| 8,855,959 B2 | 10/2014 | Johnson et al. | |
| 9,026,279 B2 | 5/2015 | Ziarno | |
| 9,260,976 B2 | 2/2016 | Phillips et al. | |
| 9,311,201 B2 | 4/2016 | Atkinson et al. | |
| 9,513,151 B2 | 12/2016 | Kwak et al. | |
| 2003/0028353 A1 | 2/2003 | Gventer | |
| 2003/0045992 A1 * | 3/2003 | Humerickhouse | F02C 9/00 |
| | | | 701/100 |
| 2008/0161989 A1 | 7/2008 | Breed | |
| 2008/0228338 A1 | 9/2008 | Howard et al. | |
| 2013/0050478 A1 * | 2/2013 | Tadepalli | G06K 9/0063 |
| | | | 348/143 |
| 2013/0268241 A1 | 10/2013 | Das et al. | |
| 2016/0350194 A1 | 12/2016 | Mohan et al. | |
| 2018/0060149 A1 * | 3/2018 | Flyax | G06F 11/079 |

\* cited by examiner

GAS TURBINE ENGINE AND TEST CELL REAL-TIME DIAGNOSTIC FAULT DETECTION AND CORRECTIVE ACTION SYSTEM AND METHOD

TECHNICAL FIELD

The present invention generally relates to gas turbine engine, and more particularly relates to systems and methods for providing real-time diagnostic fault detection and corrective action for gas turbine engines under test in a test cell as well as predict engine performance.

BACKGROUND

Gas turbine engines may undergo various performance and design tests. These tests may occur, for example during engine design and development, production, or following overhaul, repair, or inspection of the engine. Such tests are typically performed in a test cell, and demonstrate that the engine can meet its design, operational, and safety requirements.

As is generally known, a test cell is a closed facility that includes extensive instrumentation and allows for various on-wing environmental simulations. In a typical test cell, the engine under test is installed in, for example, a thrust frame, which is similar in construction to an aircraft engine mount. The thrust frame is instrumented to continuously monitor and record the data needed for testing. The recorded data are then analyzed, post-test, to assess whether the engine successfully passed the test and, if not, the root-cause(s) and/or anomaly(ies) for non-success.

Unfortunately, current test cell capabilities result in the root-causes/anomalies associated with an unsuccessful engine test to be found post-test. This is a reactive process that can result in repeat testing, negative schedule impacts, missed test objectives, inconsistent test runs, potential engine damage, and delayed shipment of engines. All of which can lead to increased overall costs.

Hence, there is a need for a system and method of testing gas turbine engines that provides a technological solution to the issues of presently known engine test cells, by providing, for example, real-time feedback of possible engine and/or test cell faults and corresponding corrective actions, thereby mitigating the negative impacts associated with unsuccessful engine tests. This allows for proactive vs. reactive test coverage. Furthermore, there is a need to predict engine performance at key sales acceptance points or key test objectives early in the run in order to avoid unnecessary engine run time if an engine is predicted to fail one or more selected test conditions. In addition, these systems would ensure engine safety as well as verify test objectives are being met real-time potentially allowing for an automated test run. An automated test run would improve consistency between engine runs (eliminating human error). Again, this system would be beneficial in many respects for both an automated and manned test environment. This present invention addresses at least this technological need.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, a real-time diagnostic and fault detection method for a gas turbine engine under test in a test cell includes supplying, to a processing system, sensor data from instrumentation coupled to the gas turbine engine that is under test in the test cell. The sensor data are processed, using a physics-based component level aero-thermal model of the gas turbine engine that is implemented in the processing system, to calculate a plurality of engine parameters at a plurality of different, non-instrumented locations within the gas turbine engine. The plurality of engine parameters are processed, in the processing system, to detect when a fault exists within the gas turbine engine. When a fault does exist within the gas turbine engine, an image that indicates at least a mostly likely cause for the fault, is rendered on a display device, one or more corrective actions that can be taken to correct the fault are generated and at least selectively rendered on the display device.

In another embodiment, a real-time diagnostic and fault detection system for a gas turbine engine under test in a test cell includes a display device, instrumentation, and a processing system. The display device is configured to render one or more images. The instrumentation is adapted to be coupled to a gas turbine engine and is configured, upon being coupled to the gas turbine engine, to supply sensor data. The processing system is coupled to the display device and is further coupled to receive the sensor data supplied from the instrumentation. The processing system is configured to implement a physics-based component level aero-thermal model of the gas turbine engine, and is further configured to process the sensor data, using the physics-based component level aero-thermal model, to calculate a plurality of engine parameters at a plurality of different, non-instrumented locations within the gas turbine engine, and process the plurality of engine parameters to detect when a fault exists within the gas turbine engine. Upon determining that a fault does exist within the gas turbine engine, the processing system is further configured to command the display device to render an image that indicates at least a mostly likely cause for the fault, generate one or more corrective actions that can be taken to correct the fault, and at least selectively command the display device to render the one or more corrective actions.

In still another embodiment, a real-time diagnostic and fault detection system for a gas turbine engine under test in a test cell includes instrumentation and a processing system. The instrumentation is adapted to be coupled to a gas turbine engine and is configured, upon being coupled to the gas turbine engine, to supply sensor data. The processing system is coupled to receive the sensor data supplied from the instrumentation, and is configured to implement a physics-based component level aero-thermal model of the gas turbine engine. The processing system is further configured to process the sensor data, using the physics-based component level aero-thermal model, to generate projections of performance of the gas turbine engine to one or more selected test conditions, and prognosticate, based on the projections of performance, as to whether the gas turbine engine will actually pass at the one or more selected test conditions or test objectives.

Furthermore, other desirable features and characteristics of the real-time diagnostic and fault detection system and method will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
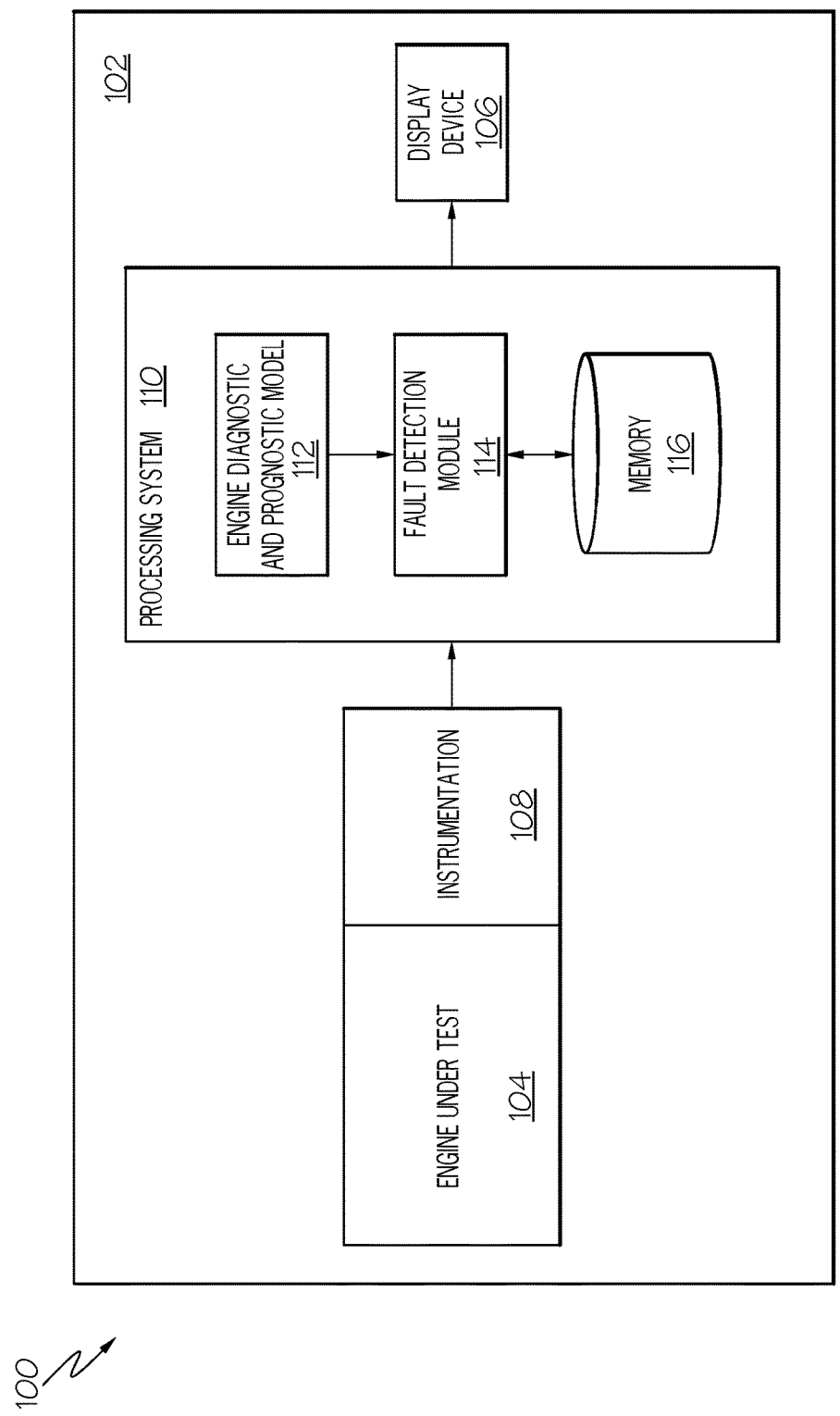
FIG. 1 depicts a functional block diagram of one embodiment of a real-time diagnostic and fault detection system.

Referring now to FIG. 1, a functional block diagram of one embodiment of a real-time diagnostic and fault detection system 100 is depicted. The system 100 is preferably implemented in a test cell 102, and is preferably used in conjunction with a gas turbine engine 104 under test in the test cell 102. The depicted system 100 includes at least a display device 106, instrumentation 108, and a processing system 110. It will be appreciated that in other embodiments the system 100 may be implemented with additional components, sub-systems, and/or systems.

The display device 106 may be implemented using any one of numerous types of display devices that is configured, in response to commands supplied from the processing system 110, to render one or more images. Some non-limiting examples of display devices include various cathode ray tube and flat panel display devices, such as various types of light-emitting diode (LED) display devices, electroluminescent display (ELD) devices, plasma display devices, liquid crystal display (LCD) devices, thin-film transistor (TFT) display devices, and organic light-emitting diode (OLED) display devices. At least some of the images that the processing system 110 commands the display device 116 to render will be described further below.

The instrumentation 108 is adapted to be coupled to a gas turbine engine. Indeed, in the embodiment depicted in FIG. 1, the instrumentation is coupled to the gas turbine engine 104 that is under test. The instrumentation 108, which is preferably implemented using a plurality of sensors, is configured, upon being coupled to the gas turbine engine 104, to supply sensor data to the processing system 110. It will be appreciated that the number and types of sensors that comprise the instrumentation may vary. Indeed, in some instances thousands of sensors or other types instrumentation may be coupled to a gas turbine engine 104 under test. Some non-limiting examples of the types of instrumentation include various types of temperature sensors, pressure sensors, flow sensors, vibration sensors, fuel flow sensors, speed sensors, force/thrust measurements, torque measurement, capacitance, metal/chip detectors, variable geometry position sensors, humidity sensors, engine control unit (ECU) parameters, and clearance sensors, just to name a few.

Regardless of the number and types of sensors and other instrumentation, the processing system 110 is coupled to the display device 106 and to the instrumentation 108, and thus receives the sensor data supplied from the instrumentation 108. The processing system 110, at least in the depicted embodiment, implements a physics-based component level aero-thermal diagnostic and prognostic model 112 of the gas turbine engine 104 and a fault detection module 114, both of which will be described in more detail. Before doing so, however, it is noted that the processing system 110 may be implemented using one or more general purpose processors, a content addressable memory, a digital signal processor, an application specific integrated circuit, a field programmable gate array, any suitable programmable logic device, discrete gate or transistor logic, discrete hardware components, or any combination designed to perform the functions described here. In particular, the processing system 110 may be realized as one or more microprocessors, controllers, microcontrollers, or state machines. Moreover, the processing system 110 may be implemented as a combination of computing devices, e.g., a combination of digital signal processors and microprocessors, a plurality of microprocessors, one or more microprocessors in conjunction with a digital signal processor core, or any other such configuration.

The processing system 110, as just noted, is configured to implement a physics-based component level aero-thermal diagnostic and prognostic model 112 of the gas turbine engine 104. A physics-based component level aero-thermal diagnostic and prognostic model 112 is a computer program for modeling any open cycle gas turbine engine system. Nearly any configuration of a propulsion or stationary gas turbine engine system can be simulated, and the number of engines and components is not restricted. The program provides generalized modeling capability by virtue of component design. The program modules are defined by component maps (compressors, combustors, turbines, etc.), functional relationships, and numerical constants that modify these maps, define the operating conditions, and determine the type of solution. The physics-based component level aero-thermal diagnostic and prognostic model 112 then uses equations that satisfy conservations of mass, momentum, and energy to define a solution of the engine model.

Figure 2:
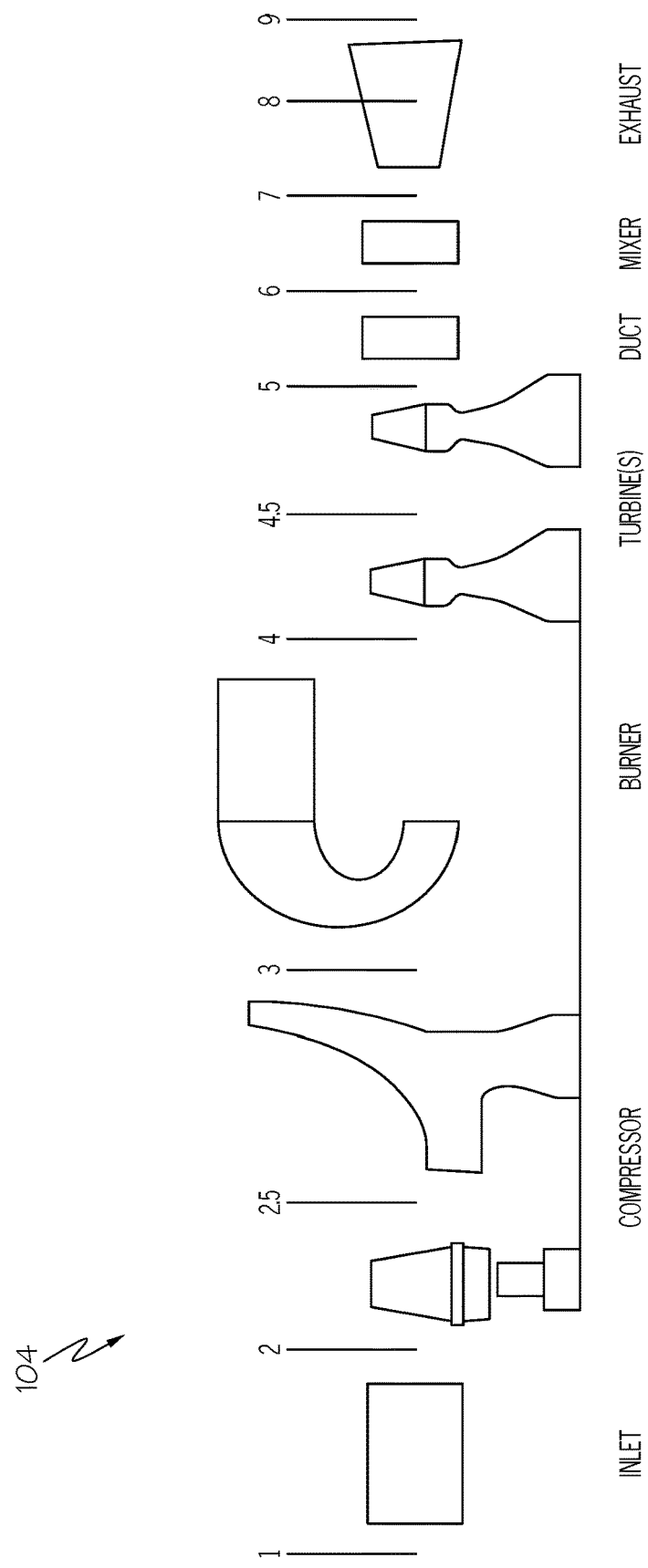
FIG. 2 depicts a partial cross-section view of a gas turbine engine illustrating various non-instrumented locations at which engine parameters may be calculated.

The processing system 110 is further configured to process the sensor data supplied from the instrumentation, using the physics-based component level aero-thermal diagnostic and prognostic model 112, to calculate a plurality of engine parameters at a plurality of different, non-instrumented locations within the gas turbine engine 104. It will be appreciated that the engine parameters and locations may vary based, for example, on engine type. Some non-limiting examples of such parameters include temperatures, pressures, flows, force/thrust, torque, fuel flow, speed, variable geometry position, efficiencies, pressure ratio, clearances, accessory load, secondary cooling flows, bleeds, and leakages, at various locations (or "stations") within the engine. As used herein, a "station" refers to a cross-sectional location in the gas turbine engine 104 along the flow path, from engine inlet to engine outlet. In some embodiments, as depicted in FIG. 2, the stations may be numbered. If so, such station numbering may, for convenience, follow a known standard, such as SAE Aerospace Standard AS755, just to name one non-limiting example.

Returning to FIG. 1, the processing system 110, in addition to calculating the engine parameters, also processes the plurality of engine parameters to detect when a fault exists within the gas turbine engine 104. To do so, the processing system 110, using the sensor data and the calculated engine parameters, compares the plurality of calculated engine parameters at the various locations (or "stations") within the gas turbine engine 104 to expected engine parameters at these various locations (or "stations"). These comparisons are referred to as component diagnostic scalars and adders, which represent the delta (Δ) from expectations. Based on this comparison, the processing system 110 generates various component diagnostic signatures. These component diagnostic signatures indicate, for example, how much, if any, various ones of the calculated engine parameters vary from the expected parameter values. As may be appreciated, each fault in an engine 104 will have a unique diagnostic signature. The measured data is compared to the plurality of model parameters to determine if real shifts in engine performance exist or if the fault is a measurement. Thermodynamic shifts are real shifts in engine performance that manifest as changes in temperatures, pressures, flows, force/thrust, torque, fuel flow, speed, variable geometry position, efficiencies, pressure ratio, clearances, accessory load, secondary cooling flows, bleeds, and leakages, at various locations versus model expectation.

Figure 3:
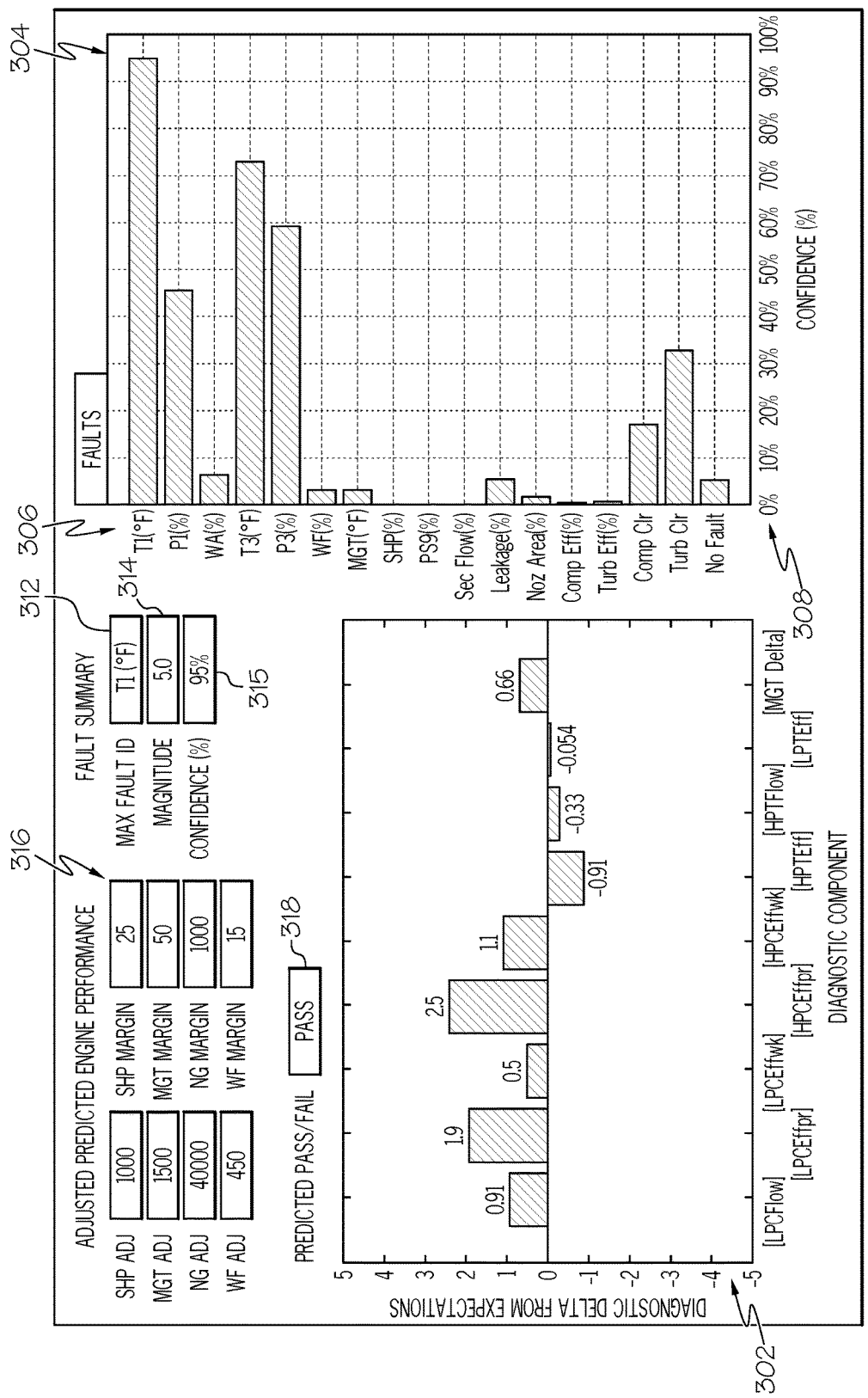
FIGS. 3 and 4 depict embodiments of various images that may be rendered on the display device of the system of FIG. 1.

Preferably, the processing system 110 is further configured to command the display device 106 to render images of these component diagnostic signatures. It will be appreciated that the manner in which the component diagnostic signatures are rendered may vary. One manner of rendering the component diagnostic signatures is depicted in FIG. 3, and shows the variations in various flows and efficiencies associated with different compressor and turbine stages within the gas turbine engine 104 under test. In the depicted embodiment, the rendered component diagnostic signature 302 includes but is not limited to variations in rotating or stationary component flow (LPCFlow, HPTFlow), efficiency (LPCEffpr, LPCEffwk, HPCEffpr, HPCEffwk, HPTEff, LPTEff), pressure ratio, work, flow path leakage, temperature bias (MGT Delta), variable geometry bias, valve position bias, control system bias, duct and flow path pressure loss, and heat transfer. It will be appreciated that these parameters are merely exemplary of one embodiment, and that the number and specific type of parameters that are rendered may vary based on, for example, engine type, engine configuration, and/or levels of instrumentation.

No matter the number and specific component diagnostic signatures that are generated, the processing system 110, and more specifically the fault detection module 114, interprets the component diagnostic signatures 302 to determine when a fault exists within the gas turbine engine 104. In one embodiment, the fault detection module 114 compares the component diagnostic signature 302 to known signatures in a fault library that may be stored, for example, in a memory storage device 116. When a fault does exist, the fault detection module 114 also determines, based on this comparison, one or more potential causes for the fault, and the likelihood of each of the one or more potential causes (i.e., percentage confidence), and the magnitude/direction of the most likely cause (i.e., cause with the highest percentage confidence).

The processing system 110, upon determining that a fault exists, additionally commands the display device 106 to render an image 304 that indicates at least the most likely cause for the fault. In the embodiment depicted in FIG. 3, the processing system 110 commands the display device 106 to render an image 304 that graphically depicts a plurality of potential causes, with each potential cause 306 listed on the vertical axis and the likelihood (%-confidence) 308 of each of the potential causes listed on the horizontal axis. Faults could include, but are not limited to, test cell instrumentation faults, engine instrumentation, positional feedbacks, area assumptions, flow leaks, component performance (flow, efficiency, work pressure ratio, temperature ratio), clearances, and variable geometry. Although the number and specific potential causes 306 may vary, in the depicted embodiment the potential causes 306 include: T1 (Cell Instrumentation Fault for Engine Inlet Temperature), P1 (Cell Instrumentation Fault for Engine Inlet Pressure), WA (Cell Instrumentation Fault for Engine Inlet Airflow), T3 (Cell Instrumentation Fault for Engine Compressor Exit Temperature), P3 (Cell Instrumentation Fault for Engine Compressor exit Pressure), WF (Cell Instrumentation Fault for Engine Fuel Flow), MGT (Cell Instrumentation Fault for engine Measured Gas Temperature (or Power Turbine Inlet Temp)), SHP (Cell Instrumentation Fault for engine Measured Shaft Horsepower (for turboshaft applications)), PS9 (Cell Instrumentation Fault for Engine Exhaust Pressure), Sec Flow (Engine Fault for Secondary Airflow internal air leakages), Leakage (Engine Fault overboard leakage), Noz Area (Turbine Nozzle Area Discrepancy), Comp Eff (Engine Fault Compressor(s) efficiency delta from expectations), Turb Eff (Engine Fault Turbine(s) efficiency delta from expectations), Comp Clr (Compressor Clearance Discrepancy), Turb Clr (Turbine Clearance Discrepancy), No Fault (No Fault Found).

As may be seen, in the depicted embodiment, the fault detection module 114 determined, with 95% confidence, that T1 (Cell Instrumentation Fault for Engine Inlet Temperature) is the cause of the fault. That is, that the engine inlet temperature sensor is the most likely cause of the fault that resulted in the depicted component diagnostic signature 302. In addition to the graphical depiction of each of the potential causes, the processing system 110 also preferably commands the display device 106 to render image fields that specify the most likely cause 312, its magnitude 314, and its %-confidence 315. For example, in the depicted embodiment, the most likely cause (e.g., 95%-confidence) is the engine inlet temperature sensor (T1) with a 5.0 F magnitude. It will be appreciated that the second, third, and so on most likely causes can be interrogated if resolution of the most likely cause does eliminate the depicted component diagnostic signature 302.

For completeness of description, and as FIG. 3 further depicts, the processing system 110 may also be configured, at least in the depicted embodiment, to command the display device 106 to render images of various parameters associated with, and that provide a summary of, engine performance 316. In the depicted embodiment, these parameters include adjusted shaft horsepower (SHP ADJ), adjusted measured gas temperature (MGT ADJ), adjusted gas generator speed (NG ADJ), adjusted fuel flow (WF ADJ), the difference between SHP and minimum allowable SHP (SHP Margin), the difference between MGT and maximum allowable MGT (MGT Margin), the difference between NG ADJ and maximum allowable NG (NG Margin), the difference between WF ADJ and maximum allowable WF (WF Margin). As used herein, "adjusted" means the parameter is adjusted for various conditions, such as, for example, environment, testing conditions, actual horsepower, etc. This allows for predicting performance at model adjusted desired conditions, as shown in a Predicted Pass/Fail field 318. It will be appreciated that these parameters are also merely exemplary of one embodiment, and that the number and specific type of parameters that are rendered may vary based on, for example, engine type and engine configuration.

After determining the most likely causes for a detected fault, the processing system 110 is additionally configured to generate one or more corrective actions that can be taken to correct the fault. In one embodiment, the processing system 110 retrieves one or more corrective actions from a corrective actions library that may be stored, for example, in the memory storage device 116. The corrective actions library includes corrective actions that leverages the experience and knowledge of engineers and technicians who have conducted tests and troubleshoot faults and causes in engine test cells for many years. The one or more corrective actions retrieved from the memory storage device will provide a list of the best known corrective action options. Upon retrieving the corrective actions, the processing system 110 is configured to at least selectively (e.g., in response to a request from a user) command the display device 106 to render the one or more corrective actions. It will be appreciated that the manner in which the corrective actions are rendered may vary. One manner of rendering the corrective actions is depicted in FIG. 4, and will now be described.

Figure 4:
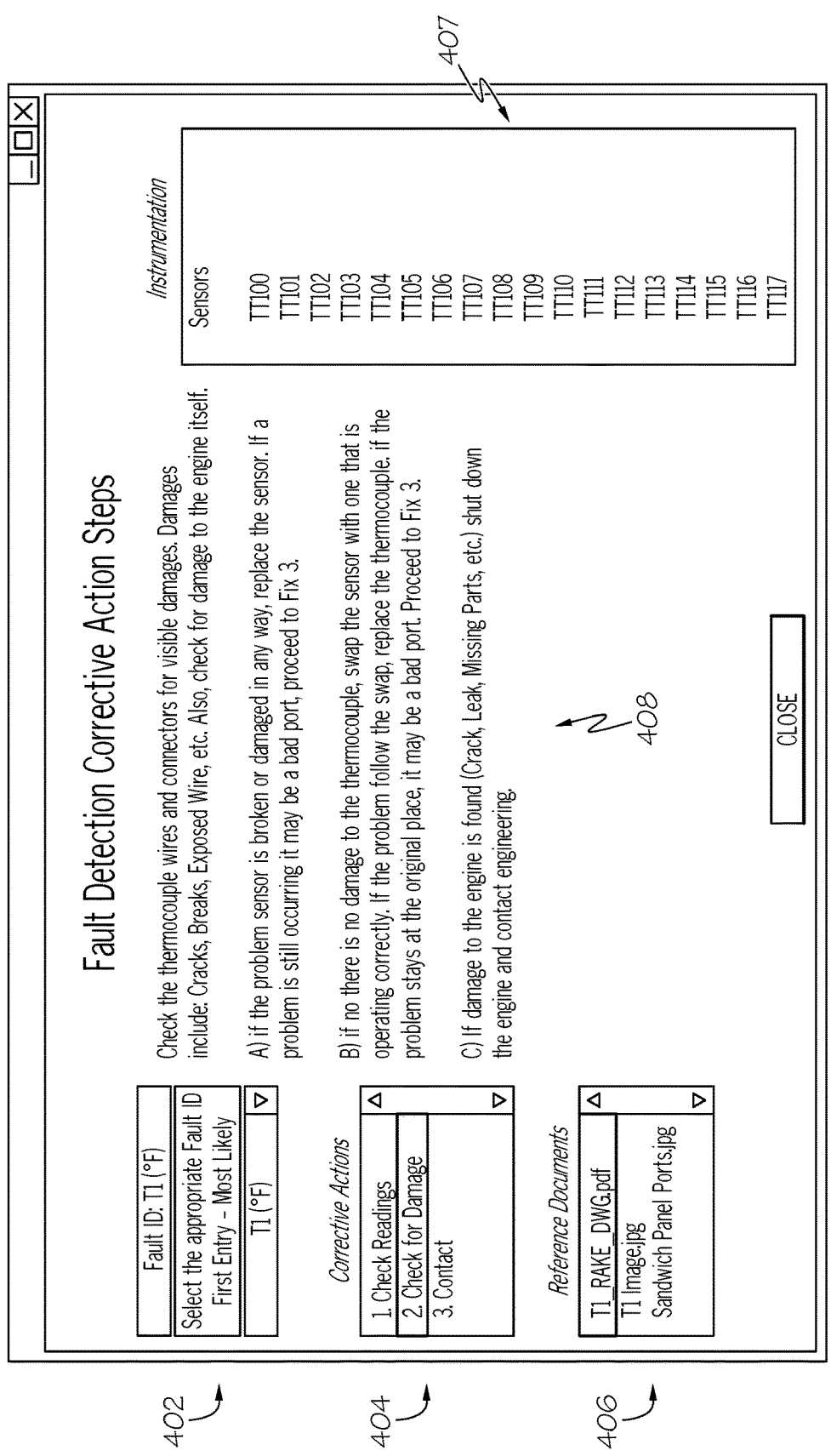

The example image depicted in FIG. 4 includes at least a Fault ID selection field 402, a Corrective Actions selection field 404, a Reference Documents selection field 406, an Instrumentation field 407, and a corrective actions description field 408. The Fault ID selection field 402 provides a dropdown menu that allows one or more particular fault causes to be selected. Preferably, the most likely cause is listed first. The Corrective Actions selection field 404 provides a dropdown menu that allows one or more corrective action types to be selected. As may be appreciated, the corrective action types that are selectable are based on the fault cause that is selected in the Fault ID selection field 402.

The Reference Documents selection field 406 provides a dropdown menu that allows one or more document types to be selected and, upon selection, viewed. As may be appreciated, the document types that are selectable are based on the fault cause that is selected in the Fault ID selection field 402. The Instrumentation field 407 provides a list of physical measurements that were evaluated in the diagnostic model for identifying a fault, and is a condensed instrumentation list of physical gauges a technician can evaluate in the test cell 102 to fix the fault. As may be appreciated, the list of instrumentation would change based on the fault selected.

The corrective actions description field 408 provides a description of the corrective actions that a technician should take to correct the fault. As may be appreciated, the corrective action description that is displayed is based on the corrective action type that is selected in the Corrective Actions selection field 404.

Thus, continuing with the example cause that was identified above, in which the mostly likely cause is the engine inlet temperature sensor (T1), the user has selected the "T1 (° F.)" option from the Fault ID selection field 402 dropdown menu. The user has, in turn, selected the "Check for Damage" option from the Corrective Actions selection field 404 dropdown menu. In response, the corrective actions to take to check the engine inlet temperature sensor for damage are rendered in the corrective actions description field 408. Moreover, the Instrumentation field 407 indicates that there are 18 individual sensors (e.g., thermocouples) that measure station 1.0 inlet temperature (TT100-TT117). The technician would evaluate each measurement to determine which one(s) have an issue and repair it accordingly using the action steps previously defined.

One of the advantages of the real-time diagnostic and fault detection system 100 is that the physics-based component level aero-thermal diagnostic and prognostic model 112 can be developed and continuously updated in real-time, using the sensor data, during engine testing in the test cell 102. The processing system 110, using the model 112, is also, in at least some embodiments, configured to generate projections of the performance of the gas turbine engine 104 to one or more selected test conditions. The processing system 110 may then process these projections to prognosticate as to whether the gas turbine engine 104 will actually pass at the one or more selected test conditions. Some non-limiting examples of selected test conditions include one more environmental conditions, engine operating conditions, one or more engine loading conditions, or any combination. As may be appreciated, this capability provides significant benefit. Being able to predict engine performance at key sales acceptance points that will occur later in an engine test run allows the engine 104 to complete a partial run (one or more health check points) to determine if it will pass/fail at critical conditions. This allows an early prediction of whether the engine 104 will pass the acceptance test before an entire test run sequence has been performed. Furthermore, the physics-based component level aero-thermal diagnostic and prognostic model can be used to determine if the engine is predicted to meet various test objectives. This can help avoid unnecessary fuel expense as well as spending time, manpower, and facilities resources if the engine is predicted to fail one or more acceptance criteria or objectives.

Figure 5:
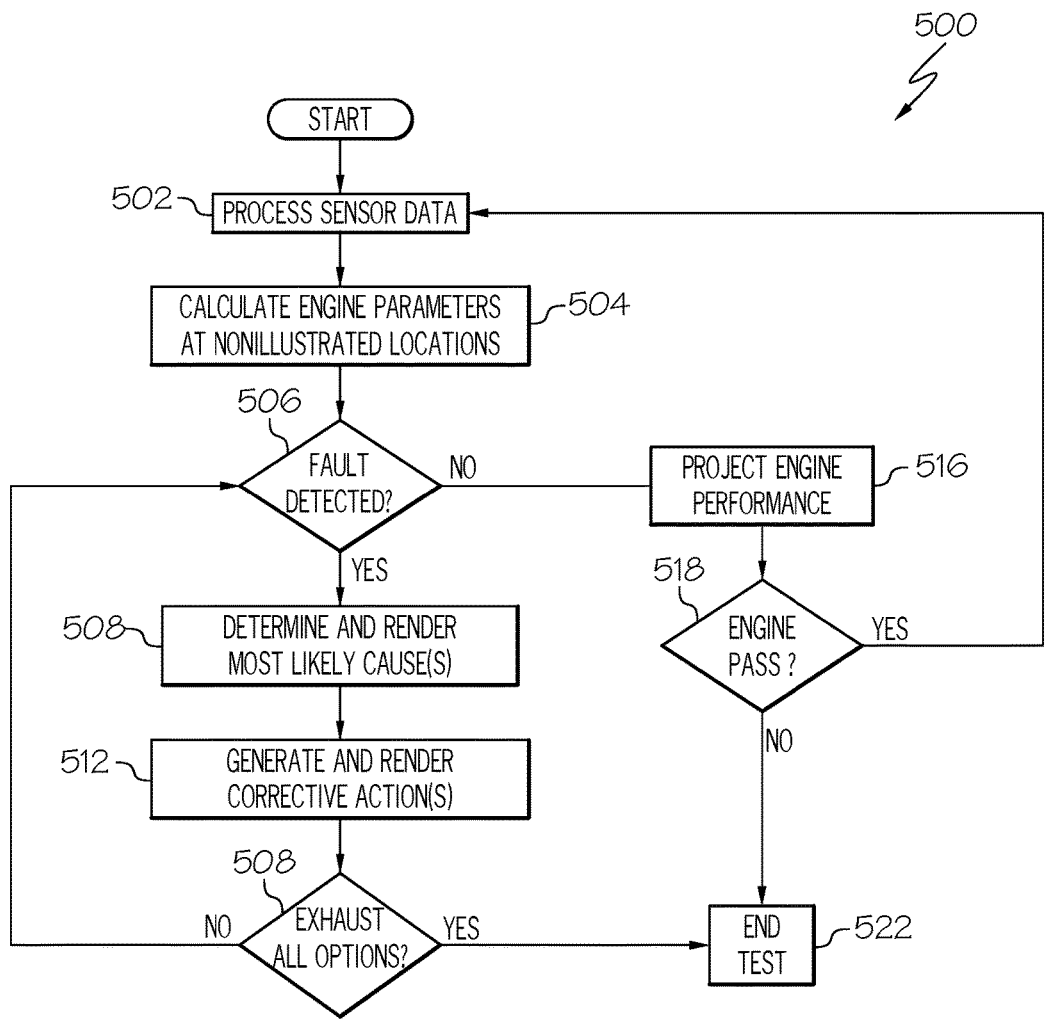
FIG. 5 depicts one embodiment of a process, in flowchart form, that may be implemented by the system of FIG. 1.

For completeness, the above-described process that the processing system implements to provide real-time diagnostic and fault detection will now be briefly described. In doing so, reference should be made to FIG. 5, which depicts an embodiment of the process 500 in flowchart form. It should be understood that the parenthetical references in the following description refer to like-numbered flowchart blocks.

Upon initiation of the process 500, the sensor data supplied from the instrumentation 108 are processed using the physics-based component level aero-thermal model of the gas turbine engine 104 (502), and a plurality of engine parameters are calculated at a plurality of different, non-instrumented locations within the gas turbine engine (504), The plurality of engine parameters are processed to detect when a fault exists within the gas turbine engine (506). When it is determined that a fault does exist, the process 500 proceeds to determining and rendering the mostly likely cause(s) for the fault (508), and then generating and rendering one or more corrective actions that can be taken to correct the fault (512). The process 500 then proceeds to check any additional faults exist until all options are exhausted (514) in which case the test may end.

When it is determined that a fault does not exist, projections of gas turbine engine performance at one or more selected test/acceptance conditions are generated (516). The projections of performance are processed to prognosticate as to whether the gas turbine engine 104 will actually pass at the one or more selected test conditions (518). If the answer is "NO", then the engine test may end (522). If the answer is "YES", then the test proceeds and the previous process steps are repeated.

The system and method described herein provide real-time feedback of possible engine and/or test cell faults and corresponding corrective actions. The system and method also allows early predictions of whether an engine will pass the acceptance test before an entire test run sequence has been performed. These capabilities avoid unnecessary fuel expense as well as spending time, manpower, and facilities resources if the engine is predicted not to pass.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "computer-readable medium", "processor-readable medium", or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

Some of the functional units described in this specification have been referred to as "modules" in order to more particularly emphasize their implementation independence. For example, functionality referred to herein as a module may be implemented wholly, or partially, as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like. Modules may also be implemented in software for execution by various types of processors. An identified module of executable code may, for instance, comprise one or more physical or logical modules of computer instructions that may, for instance, be organized as an object, procedure, or function. Nevertheless, the executables of an identified module need not be physically located together, but may comprise disparate instructions stored in different locations that, when joined logically together, comprise the module and achieve the stated purpose for the module. Indeed, a module of executable code may be a single instruction, or many instructions, and may even be distributed over several different code segments, among different programs, and across several memory devices. Similarly, operational data may be embodied in any suitable form and organized within any suitable type of data structure. The operational data may be collected as a single data set, or may be distributed over different locations including over different storage devices, and may exist, at least partially, merely as electronic signals on a system or network.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements. In this document, the term "real-time" refers to running computer programs and analysis while the engine is running in a test cell as opposed to post-test analysis. Although the process can also be executed and evaluated post-test.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

The invention claimed is:

1. A real-time diagnostic and fault detection method for a gas turbine engine under test in a test cell, the method comprising:
supplying, to a processing system, sensor data from instrumentation coupled to the gas turbine engine that is under test in the test cell;
processing the sensor data, using a physics-based component level aero-thermal model of the gas turbine engine that is implemented in the processing system, to calculate a plurality of engine parameters at a plurality of different, non-instrumented locations within the gas turbine engine;
processing, in the processing system, the plurality of engine parameters to detect when a fault exists within the gas turbine engine; and
when a fault does exist within the gas turbine engine:
rendering, on a display device, an image that indicates at least a mostly likely cause for the fault,
generating one or more corrective actions that can be taken to correct the fault, and
at least selectively rendering, on the display device, the one or more corrective actions.

2. The method of claim 1, further comprising:
processing the sensor data, using the physics-based component level aero-thermal model of the gas turbine engine, to generate projections of performance of the gas turbine engine to one or more selected test conditions; and
prognosticating, based on the projections of performance, as to whether the gas turbine engine will actually pass at the one or more selected test conditions or test objectives.

3. The method of claim 2, wherein the one or more selected test conditions include one or both of one more environmental conditions and one or more engine loading conditions.

4. The method of claim 2, further comprising:
rendering, on the display device, an image field that indicates whether the gas turbine engine will pass or fail at the one or more selected test conditions.

5. The method of claim 1, further comprising:
comparing the plurality of engine parameters at the plurality of different, non-instrumented locations to expected engine parameters at the plurality of different, non-instrumented locations;
generating, based on the comparisons, a plurality of component diagnostic signatures; and
rendering, on the display device, at least a portion of the plurality of component diagnostic signatures.

6. The method of claim 5, further comprising:
comparing, in the processing system, the component diagnostic signatures to known signatures in a stored fault library.

7. The method of claim 1, wherein the step of rendering the image that indicates at least the mostly likely cause for the fault further comprises:
rendering an image that graphically depicts (i) a plurality of potential causes for the fault and (ii) a relative likelihood that each potential cause is the cause for the fault.

8. The method of claim 1, further comprising:
rendering image fields, on the display device, that specify at least the most likely cause for the fault and its magnitude.

9. The method of claim 1, further comprising:
rendering, on the display device, images of a plurality of parameters that summarize engine performance.

10. The method of claim 1, further comprising rendering, on the display device:
a reference documents selection field that provides a dropdown menu that allows one or more document types to be selected and, upon selection, viewed; and
an instrumentation field that provides a list of physical measurements that were evaluated in identifying the fault.

11. A real-time diagnostic and fault detection system for a gas turbine engine under test in a test cell, the system comprising:
a display device configured to render one or more images;
instrumentation adapted to be coupled to a gas turbine engine, the instrumentation configured, upon being coupled to the gas turbine engine, to supply sensor data;
a processing system coupled to the display device and further coupled to receive the sensor data supplied from the instrumentation, the processing system configured to implement a physics-based component level aero-thermal model of the gas turbine engine, the processing system further configured to:
process the sensor data, using the physics-based component level aero-thermal model, to calculate a plurality of engine parameters at a plurality of different, non-instrumented locations within the gas turbine engine,
process the plurality of engine parameters to detect when a fault exists within the gas turbine engine, and
upon determining that a fault does exist within the gas turbine engine:
(i) command the display device to render an image that indicates at least a mostly likely cause for the fault,
(ii) generate one or more corrective actions that can be taken to correct the fault, and
(iii) at least selectively command the display device to render the one or more corrective actions.

12. The system of claim 11, wherein the processing system is further configured to:
process the sensor data, using the physics-based component level aero-thermal model of the gas turbine engine, to generate projections of performance of the gas turbine engine to one or more selected test conditions; and prognosticate, based on the projections of performance, as to whether the gas turbine engine will actually pass at the one or more selected test conditions.

13. The system of claim 12, wherein the one or more selected test conditions include one or both of one more environmental conditions and one or more engine loading conditions.

14. The system of claim 12, wherein the processing system is further configured to command the display device to render an image field that indicates whether the gas turbine engine will pass or fail at the one or more selected test conditions.

15. The system of claim 11, wherein the processing system is further configured to:
compare the plurality of engine parameters at the plurality of different, non-instrumented locations to expected engine parameters at the plurality of different, non-instrumented locations;
generate, based on the comparisons, a plurality of component diagnostic signatures;
compare the component diagnostic signatures to known signatures in a stored fault library; and
command the display device to render at least a portion of the plurality of component diagnostic signatures.

16. The system of claim 11, wherein the processing system is further configured to command the display device to render an image that graphically depicts (i) a plurality of potential causes for the fault and (ii) a relative likelihood that each potential cause is the cause for the fault.

17. The system of claim 11, wherein the processing system is further configured to command the display device to render image fields that specify at least the most likely cause for the fault and its magnitude.

18. The system of claim 11, wherein the processing system is further configured to command the display device to render images of a plurality of parameters that summarize engine performance.

19. The system of claim 11, wherein the processing system is further configured to command the display device to render:
a reference documents selection field that provides a dropdown menu that allows one or more document types to be selected and, upon selection, viewed; and
an instrumentation field that provides a list of physical measurements that were evaluated in identifying the fault.

20. A real-time diagnostic and fault detection system for a gas turbine engine under test in a test cell, the system comprising:
instrumentation adapted to be coupled to a gas turbine engine, the instrumentation configured, upon being coupled to the gas turbine engine, to supply sensor data;
a processing system coupled to receive the sensor data supplied from the instrumentation, the processing system configured to implement a physics-based component level aero-thermal model of the gas turbine engine, the processing system further configured to:
process the sensor data, using the physics-based component level aero-thermal model, to generate projections of performance of the gas turbine engine to one or more selected test conditions, and
prognosticate, based on the projections of performance, as to whether the gas turbine engine will actually pass at the one or more selected test conditions.

* * * * *